United States Patent
Gerlach et al.

(10) Patent No.: US 6,608,674 B2
(45) Date of Patent: Aug. 19, 2003

(54) DEVICE FOR COMBINING OPTICAL RADIATION

(75) Inventors: Mario Gerlach, Eisenberg (DE); Bastiaan Oostdijck, Den Haag (NL)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/894,474

(22) Filed: Jun. 27, 2001

(65) Prior Publication Data

US 2002/0051291 A1 May 2, 2002

(30) Foreign Application Priority Data

Jun. 28, 2000 (DE) .......................... 100 31 414

(51) Int. Cl.[7] ............................. G01J 1/42; G02B 27/14
(52) U.S. Cl. ........................................ 356/218; 359/629
(58) Field of Search ............................ 356/218; 359/629

(56) References Cited

U.S. PATENT DOCUMENTS

| | | | |
|---|---|---|---|
| 5,309,422 A | * 5/1994 | Kuroki et al. | ............... 359/629 |
| 6,074,065 A | 6/2000 | Mayer et al. | |
| 6,128,133 A | * 10/2000 | Bergmann | ................. 359/629 |
| 6,394,603 B2 | 5/2002 | Miwa et al. | |

FOREIGN PATENT DOCUMENTS

| | | |
|---|---|---|
| DE | 41 01 044 | 12/1991 |
| DE | 42 18 642 | 12/1992 |
| DE | 198 16 302 | 11/1999 |

* cited by examiner

*Primary Examiner*—Scott J. Sugarman
(74) *Attorney, Agent, or Firm*—Reed Smith LLP

(57) ABSTRACT

A device is disclosed for combining optical radiation by utilizing the polarization properties of light and which includes a plane-parallel optically transparent plate with a refraction index n which has an optically active first surface on which a first optical beam (active beam) impinges, and a second optically active surface parallel to the first one on which a second optical beam (targeting beam) impinges at the exit location of the first beam from this second surface. The plane-parallel plate is arranged relative to the beams or the beam paths to be coupled in such a manner that the first beam impinges on the first surface of the plate and the second beam impinges on the second surface of the plate and that both do this at an angle α which is equal to or approximately equal to the Brewster angle corresponding to the refractive index n of the plate. The first and the second beam are linearly polarized, the plane of polarization of the first beam being parallel to the plane of incidence of the device and the plane of polarization of the second beam being vertical to the plane of incidence of the device.

10 Claims, 1 Drawing Sheet

DEVICE FOR COMBINING OPTICAL RADIATION

BACKGROUND OF THE INVENTION a) Field of the Invention

The invention is directed to a device for combining optical radiation by taking advantage of the polarization properties of light, in particular for medical equipment.

b) Description of the Related Art

Large areas of the use of lasers as radiation sources in the visible or invisible part of the spectrum in medicine and technology require the optical marking of the zone that is being worked on by means of a targeting or marking laser, the wavelength of the targeting laser normally being in the visible part of the spectrum. An active beam of an active beam laser is, for example, utilized for the irradiation of diseased areas, for example inside the eye. The active laser beam and the targeting laser beam are usually combined by means of dichroic optical elements, and/or parts of the radiation are decoupled from the active beam which amongst other things are used for measuring purposes.

Beam-splitter cubes or partially reflective plane-parallel plates arranged, for example, at an angle of 45° in the corresponding beam path are used as such optical elements. These elements usually have a dielectric coating for the purpose of reducing reflection losses of their optically active surfaces on the wavelength of the active beam. In contrast, the coupling-in of the marking laser is done via dielectric coatings with a high degree of reflection on the surfaces. Reflected parts of the active beam caused by the combining optics can be used for power control and power monitoring of the active beam.

One such element is described in DE 19816302 C1 in connection with a device for the radiotherapy of tissue parts. For this device, a targeting beam and an active or therapy beam are combined by an optical element represented by a plane-parallel plate. This element has two optically active surfaces on which the combination of the beams and the decoupling of at least one partial beam from the active beam take place. The decoupled partial beams are directed onto photodetectors, the signals from which are used for control or monitoring purposes after they have been further processed appropriately.

The disadvantages of this prior art can described approximately as follows: It requires modifications of the optical surfaces of the corresponding optical elements for the reduction of reflection losses and coupling losses. The realization is done by means of the application of dielectric layers which at the same time as reducing the degree of reflection of the surfaces on the wavelength of the active beam also increase the degree of reflection of the marking wavelength, but dielectric layers have the disadvantage that their optical properties change depending on environmental conditions. A change of environmental temperature or of air humidity can cause a marked change of the degree of reflection of the layer, the proportion of scattering losses and the wavelength characteristics. For the use of a coupling element according to prior art, this can lead to losses of power, wrong measurements, monitoring gaps and, in the case of application in medical equipment, ultimately to people being endangered. To minimize sensitivity towards environmental influences, optical wedges or prismatic elements are cemented on to ensure the orthogonality of the incident beam and the optical surfaces, but these measures have as a consequence the disadvantages that optical aberrations, like astigmatism, are caused by the coupling element, and complex dielectric coatings are still necessary on the coupling element, which increases production complexity.

OBJECT AND SUMMARY OF THE INVENTION

Therefore, it is the primary object of the invention to provide a device for combining optical radiation from which the disadvantages of prior art have been removed to the largest extent and for which a combination of active beam and marking or targeting beam as well as the decoupling of beam parts are attained with minimal coupling losses by means of a constructionally simple optical coupling element by utilization of the polarizing properties of light.

In accordance with the invention, a device for combining optical radiation by utilizing the polarization properties of light is disclosed which comprises a plane-parallel optically transparent plate with a refraction index n which has an optically active first surface on which a first optical beam (active beam) impinges and a second optically active surface parallel to the first one on which a second optical beam (targeting beam) impinges on the exit location of the first beam from said second surface. The plane-parallel plate is arranged relative to the beams or the beam paths to be coupled in such a way that the first beam impinges on the first surface of the plate and the second beam impinges on the second surface of the plate and that both do this at an angle $\alpha$ which is equal to or approximately equal to the Brewster angle corresponding to the refractive index n of the plate. The first and second beams are linearly polarized. The plane of polarization of the first beam is parallel to the plane of incidence of the device and the plane of polarization of the second beam is orthogonal to the plane of incidence of the device.

So that the first and the second beam take the same course and have identical paths, it is useful for the second beam, which advantageously is the targeting or marking beam, to be brought together collinearly with the first beam at the exit location of the first beam from the second surface of the plane-parallel plate.

It is furthermore advantageous if a first partial beam is generated through reflection at the location of entry of the first beam into the plane-parallel plate, if a second partial beam is generated through reflection at the location of the exit of the first beam on the plane-parallel plate and if these partial beams are allocated to photodetectors, these being connected with a processing unit for generating control signals. By means of these split off partial beams, corresponding control signals can be generated which can be used for controlling or regulating the active and/or the targeting beam.

It is furthermore advantageous if polarization, absorption, holographic or dielectric filters lie in front of the photodetectors in the beam path of the partial beams.

The main advantage of the invention results from the fact that reflection reducing dielectric layers on the optically active surfaces of the plane-parallel plate are not used. On the one hand, cost and time required for the coating operation can be saved, on the other hand, all problems that occur in connection with dielectric layers no longer apply. This means that changing environmental conditions can not lead to a change of the layer properties. Since the degree of reflection of the optical surfaces only depends on the refractive index of the glass material, on the angle of incidence and, to a very low degree, on the divergence of the laser, the system proves itself to be invariant towards changing environmental conditions. In the case of the suggested arrangement, a highest possible independence of the influence of humidity and temperature is achieved.

BRIEF DESCRIPTION OF THE DRAWING

The invention is subsequently to be described in detail using an embodiment example. In the drawing.

DESCRIPTION OF THE PREFERRED EMBODIMENTS

Figure 1:
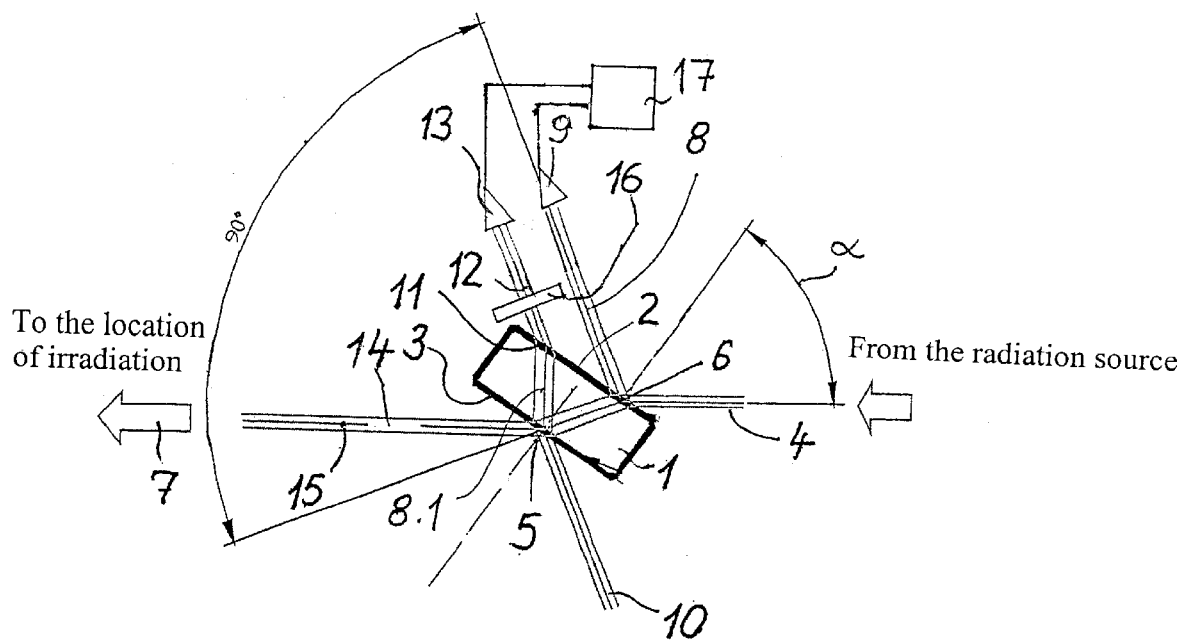
FIG. 1 shows the device according to the invention.

The basic structure of the device according to the invention is detailed using FIG. 1. It includes a plane-parallel plate 1 made of a material, for example plastic, glass or crystal, which has a refractive index n, is optically transparent for the used wavelength and which has an optically active first surface 2 and parallel to this a second optically active surface 3. In the embodiment example shown in FIG. 1, a first beam 4 emitted as the active beam by a radiation source not shown here impinges on the first surface 2 at an angle α equal to or nearly equal to the Brewster angle corresponding to the refraction index of plate 1. Of a beam incident on a boundary surface at the Brewster angle, the beam refracted by this boundary surface and the beam 8 reflected on this surface enclose an angle of 90 degrees. This active beam 4, which is linearly polarized and the polarization plane of which runs parallel to the plane of incidence of the device (plane-parallel plate 1), is refracted by the surface 2 of the plane-parallel plate 1 and leaves this plane-parallel plate 1 at the location of exit 5 in direction of a location of irradiation (arrow 7) with a parallel offset to the first beam 4 entering at the location of entry 6. For a first radiation 4 polarized in such a manner, the part of the beam entering into the plane-parallel plate 1 at the boundary surface is very large compared to the radiation 8 reflected at this boundary surface so that the largest part of the incident radiation of the first beam 4 passes through the plane-parallel plate 1.

The part 8 of the incident active beam 4 reflected on the location of entry 6 is directed onto a photodetector 9. Since the first beam or active beam 4 is linearly polarized and its polarization plane runs parallel to the plane of incidence of the device, this beam 4 only experiences extremely low reflection losses when passing through the plane-parallel plate 1. At the location of exit 5 on the second surface 3 of the plane-parallel plate 1 of the refracted part of the active beam 4, a second beam 10, which can be a targeting or marking beam, is coupled into the beam 4 in an advantageous manner. A small part of the second beam 10 is refracted by the plane-parallel plate 1 and goes through the plate and leaves the plane-parallel plate 1 at a location 11 on the first surface as a refracted part 12 and can also be directed towards a photodetector 13.

The plane of polarization of the second beam 10—the targeting beam—advantageously runs orthogonal to the plane of incidence of the device, so that the beam 10 is reflected on this second surface 3 with a high degree of reflection. The part reflected by the plane-parallel plate 1 amounts to approximately 20% to 30%. The rest passes through plate 1.

For the device according to the invention, the lateral position of the plane-parallel plate 1 is chosen in such a way that the exiting beam leaves plate 1 in the center (location of exit 5) because of the optical beam offset. Because of the conditions of symmetry, it is therefore ensured that even residual front- and rearside reflections on surface 2 and 3 can be evaluated without vignetting. The distance between these front- and rearside reflections which are running geometrically parallel to each other depends on the angle of the plate to the optical axis 15, the refraction index n of the plate 1 as well as the thickness of the plate 1, but since the refraction index n of the plane-parallel plate 1 determines the Brewster angle and therefore the angle to the optical axis 15 which runs parallel to the beam 4, the distance of the exiting beams (reflected part 8 and refracted part 12) can only be regulated by means of the plate thickness d.

Figure 2:
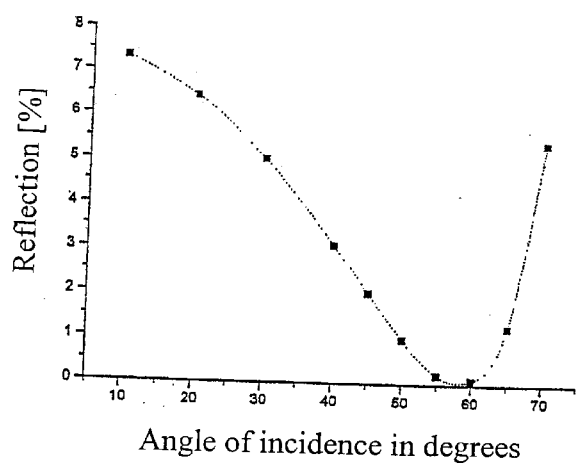
FIG. 2 shows the degree of polarization dependent reflection on the plane-parallel plate as a function of the angle of incidence.

FIG. 2 shows the degree of reflection by the plane-parallel plate 1 as a function of the angle of incidence of the active beam. The marked minimum of the degree of reflection in the environment of the Brewster angle is distinctly obvious. In the operating point of the device, a vestigial degree of reflection of 0.05% is attainable per optical surface for the active ray without any additional means for reflection reduction.

The plane of polarization of the second beam 10 is set to be orthogonal to the plane of incidence of the device. Since the Brewster condition is not fulfilled here, a degree of reflection is achieved that—depending on the refraction index n of the plane-parallel plate 1—is 600 to 1000 times larger than the degree of reflection of the first beam 4. This means that the second beam 10, the targeting beam, can be coupled into the active beam 4 efficiently by means of an optical component part in the shape of the plane-parallel plate 1 which lets the active beam 4 pass through nearly without any losses. Within the distance of the rays of the vestigial reflection a photo detector is positioned for measuring and monitoring the power of the active beam.

To prevent wrong measurements of the active beam power because of transmitted marking beam power, one or more filters 16 are arranged in front of the photodetectors connected to a computing or evaluating unit 17. The filter 16 blocks the transmitted marking beam power while the reflected part 8.1 of the active beam 4 reaches the photodetector 9 nearly without any losses. In another case of application, the filter 16 can also be transmittive for the wavelength of the targeting beam and filter out vestiges of the active beam 4 that are still present.

This extreme division of reflective conditions can only be achieved by utilization of Brewster's law and by use of strictly linearly polarized active and targeting beams 4 and 10.

While the foregoing description and drawings represent the present invention, it will be obvious to those skilled in the art that various changes may be made therein without departing from the true spirit and scope of the present invention.

What is claimed is:

1. A device for combining optical radiation by utilizing the polarization properties of light, comprising:
    a plane-parallel optically transparent plate with a refraction index n which has an optically active first surface on which a first optical beam (active beam) impinges, and a second optically active surface parallel to the first one on which a second optical beam (targeting beam) impinges on the exit location of the first beam from said second surface;
    said plane-parallel plate being arranged relative to the beams or the beam paths to be coupled in such a way that the first beam impinges on the first surface of the plate and the second beam impinges on the second surface of the plate and that both do this at an angle α which is equal to or approximately equal to the Brewster angle corresponding to the refractive index n of the plate; and said first and second beam being linearly polarized;

the plane of polarization of the first beam being parallel to the plane of incidence of the device and the plane of polarization of the second beam being vertical to the plane of incidence of the device.

2. The device according to claim 1, wherein the second beam is combined collinearly with the first beam at the location of exit of the first beam from the second face of the plane-parallel plate.

3. The device according to claim 1, wherein a first partial beam is generated by reflection at the location of entry of the first beam into the plane-parallel plate, wherein a second partial beam is generated by reflection at the location of impingement of the second beam on the plane-parallel plate, and wherein each of these partial beams has been allocated to a photodetector, these being connected to a processing unit for the generation of control signals.

4. The device according to claim 3, wherein polarization, absorption, holographic or dielectric filters are to be provided in the beam paths of the partial beams arranged in front of the photodetectors.

5. The device according to claim 1, wherein the first and the second beam are linearly polarized and the planes of polarization of these beams are orthogonal to each other.

6. A device for combining optical radiation by utilizing the polarization properties of light, comprising:

a plane-parallel optically transparent plate with a refraction index n which has an uncoated optically active first surface on which a first optical beam as an active beam impinges, and a second uncoated optically active surface parallel to the first one on which a second optical beam as a targeting beam impinges on the exit location of the first beam from said second surface;

said plane-parallel plate being arranged relative to the beams or the beam paths to be coupled in such a way that the first beam impinges on the first surface of the plate and the second beam impinges on the second surface of the plate and that both do this at an angle α which is equal to or approximately equal to the Brewster angle corresponding to the refractive index n of the plate; and said first and second beam being linearly polarized;

the plane of polarization of the first beam being parallel to the plane of incidence of the device and the plane of polarization of the second beam being vertical to the plane of incidence of the device.

7. The device according to claim 6, wherein the second beam is combined collinearly with the first beam at the location of exit of the first beam from the second face of the plane-parallel plate.

8. The device according to claim 6, wherein a first partial beam is generated by reflection at the location of entry of the first beam into the plane-parallel plate, wherein a second partial beam is generated by reflection at the location of impingement of the second beam on the plane-parallel plate, and wherein each of these partial beams has been allocated to a photodetector, these being connected to a processing unit for the generation of control signals.

9. The device according to claim 8, wherein polarization, absorption, holographic or dielectric filters are to be provided in the beam paths of the partial beams arranged in front of the photodetectors.

10. The device according to claim 6, wherein the first and the second beam are linearly polarized and the planes of polarization of these beams are orthogonal to each other.

* * * * *